United States Patent
Malmborg et al.

(10) Patent No.: US 12,008,546 B2
(45) Date of Patent: Jun. 11, 2024

(54) METHOD FOR PREVENTING THE MISUSE OF ELECTRONIC ACCESS PERMISSIONS, WHICH CAN BE MANAGED IN MOBILE ELECTRONIC DEVICES USING A WALLET APPLICATION AND WHICH ARE TRANSMITTED TO THE MOBILE ELECTRONIC DEVICES BY A SERVER, IN EACH CASE USING A LINK FOR DOWNLOADING THE ACCESS PERMISSION

(71) Applicant: SKIDATA AG, Grödig/Salzburg (AT)

(72) Inventors: Anders Malmborg, Salzburg (AT); Vaijayanthi Mala Jayaprakash, Karnataka (IN)

(73) Assignee: SKIDATA GmbH, Grödig/Salzburg (AT)

( * ) Notice: Subject to any disclaimer, the term of this patent is extended or adjusted under 35 U.S.C. 154(b) by 0 days.

(21) Appl. No.: 18/343,436

(22) Filed: Jun. 28, 2023

(65) Prior Publication Data

US 2023/0342756 A1 Oct. 26, 2023

Related U.S. Application Data

(63) Continuation of application No. 16/040,628, filed on Jul. 20, 2018, now abandoned.

(30) Foreign Application Priority Data

Aug. 7, 2017 (EP) .................................... 17185122

(51) Int. Cl.
*G06Q 20/32* (2012.01)
*G06F 16/23* (2019.01)
(Continued)

(52) U.S. Cl.
CPC ......... *G06Q 20/363* (2013.01); *G06Q 20/322* (2013.01); *G06Q 20/351* (2013.01);
(Continued)

(58) Field of Classification Search
CPC .............. G06Q 20/363; G06Q 20/351; G06Q 20/4016; G06Q 20/401; G06Q 20/3674;
(Continued)

(56) References Cited

U.S. PATENT DOCUMENTS 9,785,764 B2 * 10/2017 Loughlin-McHugh ......................
G06F 21/35
2001/0032312 A1 10/2001 Runje et al.
(Continued)

FOREIGN PATENT DOCUMENTS

WO WO-2018142587 A1 * 8/2018 ............. G06Q 20/04
WO 2018142587 A1 6/2019

OTHER PUBLICATIONS

European Search Report issued in corresponding European Patent Application No. 17185122.3 dated Feb. 9, 2018.

*Primary Examiner* — Daniel S Felten
*Assistant Examiner* — Douglas W Pinsky
(74) *Attorney, Agent, or Firm* — Finch & Maloney PLLC

(57) ABSTRACT

A method for preventing misuse of electronic access permissions, managed in mobile electronic devices using a wallet application and transmitted by a server. A link is purchased from the server, during which a password or authentication data and a mobile electronic device, are specified via the link. When activating the link, an ID of the first mobile electronic device, which is associated with an ID of the purchased access permission, is transmitted to the server. The electronic access permission is only transferable from the first mobile electronic device to another mobile electronic device after the password is first entered with the (Continued)

server. Upon transfer, in the server the access permission ID is associated with the ID of the other mobile electronic device and the access permission stored on the first mobile electronic device is marked as invalid.

6 Claims, 1 Drawing Sheet

(51) Int. Cl.
| | |
|---|---|
| *G06Q 20/10* | (2012.01) |
| *G06Q 20/34* | (2012.01) |
| *G06Q 20/36* | (2012.01) |
| *G06Q 20/38* | (2012.01) |
| *G06Q 20/40* | (2012.01) |
| *G06Q 40/06* | (2012.01) |
| *H04L 29/06* | (2006.01) |
| *H04W 12/06* | (2021.01) |
| *H04W 12/08* | (2021.01) |
| *G06F 21/31* | (2013.01) |
| *G06F 21/32* | (2013.01) |
| *G06F 21/45* | (2013.01) |
| *G06Q 40/02* | (2023.01) |
| *H04W 4/14* | (2009.01) |
| *H04W 12/062* | (2021.01) |
| *H04W 12/72* | (2021.01) |
| *H04W 60/00* | (2009.01) |

(52) U.S. Cl.
CPC ....... *G06Q 20/3674* (2013.01); *G06Q 20/401* (2013.01); *G06Q 20/4014* (2013.01); *G06Q 20/4016* (2013.01); *H04W 12/06* (2013.01); *H04W 12/08* (2013.01); *H04L 2463/102* (2013.01)

(58) Field of Classification Search
CPC ............. G06Q 20/322; G06Q 20/4014; G06Q 20/382; H04W 12/08; H04W 12/06; H04L 2463/102; G06F 21/6209; G06F 21/51; G06F 21/46; G06F 21/44
See application file for complete search history.

(56) References Cited

U.S. PATENT DOCUMENTS

| | | | |
|---|---|---|---|
| 2003/0149662 A1* | 8/2003 | Shore .................... | G06Q 20/10 705/39 |
| 2006/0212405 A1* | 9/2006 | Gordon .................. | G06F 21/10 705/59 |
| 2007/0276944 A1* | 11/2007 | Samovar ................. | G07C 9/27 709/225 |
| 2009/0138973 A1 | 5/2009 | Courtay et al. | |
| 2013/0238372 A1 | 9/2013 | Jordan | |
| 2014/0195276 A1 | 7/2014 | Tacchi et al. | |
| 2016/0171497 A1 | 6/2016 | Kerschbaumer | |
| 2016/0350547 A1* | 12/2016 | Loughlin-McHugh ..................... H04L 67/306 | |
| 2017/0116693 A1* | 4/2017 | Rae ....................... | G06Q 50/184 |
| 2018/0018595 A1* | 1/2018 | Scott .................... | G06Q 20/0457 |
| 2018/0260539 A1 | 9/2018 | Puri et al. | |
| 2018/0322259 A1 | 11/2018 | Solow et al. | |

* cited by examiner

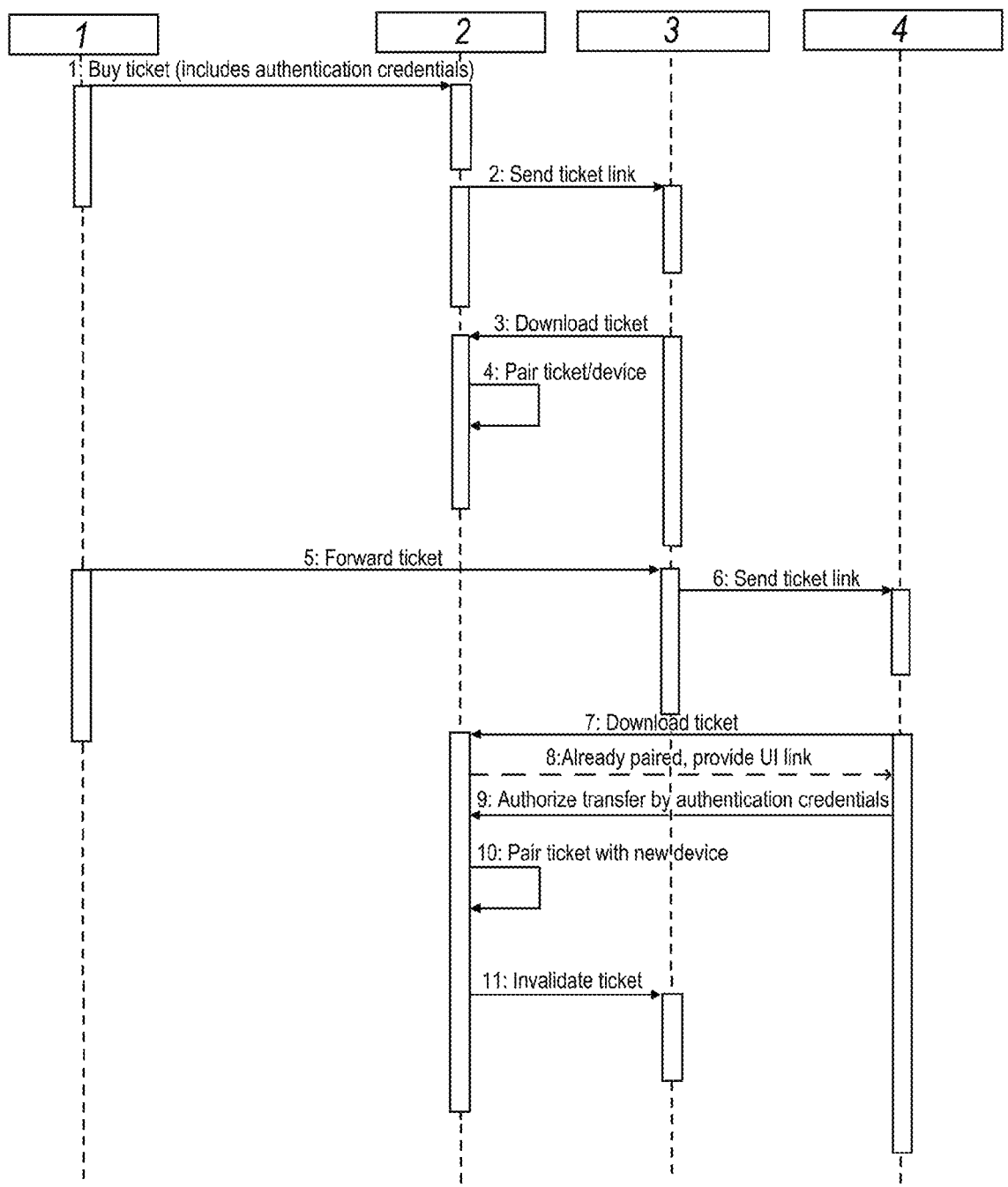

METHOD FOR PREVENTING THE MISUSE OF ELECTRONIC ACCESS PERMISSIONS, WHICH CAN BE MANAGED IN MOBILE ELECTRONIC DEVICES USING A WALLET APPLICATION AND WHICH ARE TRANSMITTED TO THE MOBILE ELECTRONIC DEVICES BY A SERVER, IN EACH CASE USING A LINK FOR DOWNLOADING THE ACCESS PERMISSION

This application is a divisional of application Ser. No. 16/040,628 filed Jul. 20, 2018 which claims priority from European patent application serial no. 17185122.3 filed Aug. 7, 2017.

FIELD OF THE INVENTION

The present invention relates to a method for preventing the misuse of electronic access permissions, which can be managed in mobile electronic devices using a wallet application and which are transmitted to the mobile electronic devices by a server, in each case using a link for downloading the access permission.

BACKGROUND OF THE INVENTION

From the prior art it is known to store and manage electronic access permissions, for example by means of so-called wallet applications on mobile electronic devices, such as smartphones and tablets. In this case it is possible, for example, by means of the IOS "Wallet" app, to forward electronic access permissions to other mobile electronic devices. This increases the convenience for the user, in the case where an authorized person would like to use a new mobile electronic device; on the other hand, this technique can allow personal electronic access permissions to be "borrowed", thereby allowing a misuse of these access permissions.

SUMMARY OF THE INVENTION

The object of the present invention is to specify a method for preventing the misuse of electronic access permissions, which can be managed in mobile electronic devices using a wallet application and which are transmitted to the mobile electronic devices by a server, in each case using a link for downloading the access permission, the use of which excludes the possibility of misuse of the access permission while at the same time ensuring the facility for transmitting the electronic access permission to another mobile electronic device of an authorized person.

This object is achieved by the features of the independent claim(s). Further configurations according to the invention and advantages are apparent from the dependent claims.

Consequently, a method is proposed for preventing the misuse of electronic access permissions, which can be managed in mobile electronic devices using a wallet application and which are transmitted to the mobile electronic devices by a server, in each case using a link for downloading the access permission, wherein in said method an electronic access permission is purchased by means of an interaction with a server, wherein during the purchase of the electronic access permission by a buyer, a password or authentication data and a mobile electronic device are specified, wherein the electronic access permission is transmitted from the server to the mobile electronic device by means of a link for downloading the access permission.

According to the invention, in implementing the link for downloading the purchased access permission a unique ID of the mobile electronic device is transmitted to the server, which is associated with an ID of the acquired access permission, wherein a transmission of the electronic access permission from the first mobile electronic device to another mobile electronic device takes place only after the input of the password specified by the purchaser of the access permission, and/or input of the authentication data specified by the buyer of the access permission by means of an interaction with the server, wherein on completion of the transfer the access permission ID is associated with the ID of the other mobile electronic device in the server, and the server marks the access permission stored on the first mobile electronic device as invalid.

In the context of one design of the invention, after the transmission of the link for downloading the access permission to the mobile electronic device, a wallet application installed on the mobile device activates the link and in order to download the acquired access permission a unique ID of the mobile electronic device is transmitted to the server, wherein it is verified in the server whether an ID of the acquired access permission is associated with the transmitted unique ID of the mobile electronic device, wherein if this is not the case, the access permission ID and the unique ID of the mobile electronic device are associated with each other and the electronic access permission is then downloaded.

In the event that the electronic access permission is to be transferred from one mobile electronic device to another mobile electronic device, the wallet application of the mobile electronic device, whose unique ID is associated with the access permission ID, transmits a link for downloading the access permission to the other mobile electronic device, wherein the wallet application of the other mobile electronic device activates the link and transmits a unique ID of the other mobile electronic device to the server.

According to the invention, it is verified in the server whether an association of the access permission ID with a unique ID of another mobile electronic device exists, wherein if this is the case, the server sends a link to the other mobile electronic device, the activation of which by the wallet application leads to an input screen for either the password specified by the purchaser of the access permission or for the authentication data specified by the purchaser of the access permission, wherein if the password is valid or the authentication data are valid, the access permission ID is associated with the ID of the other mobile electronic device in the server and the electronic access permission is downloaded to the other mobile electronic device.

Then, the access permission stored on the first mobile electronic device is marked by the server as invalid, preferably by means of a push message to the wallet application, wherein the association of the ID of the first mobile electronic device with the electronic access permission is deleted and the corresponding data are stored on the server.

The design according to the invention provides a method for preventing the misuse of electronic access permissions, which can be managed in mobile electronic devices using a wallet application and which are transmitted to the mobile electronic devices by a server, in each case using a link for downloading the access permission, the activation of which ensures that an access permission can only be transferred to another mobile electronic device if this is a mobile electronic device of an authorized person.

In the context of an extension of the invention, if an access permission is to be transferred from one mobile electronic device to another mobile electronic device, i.e. if the access permission ID has already been associated with a unique ID of a mobile electronic device, then on the basis of the number of the completed associations from the access permission ID to unique IDs of mobile electronic devices it is verified how often the access permission has already been transferred, wherein if the number of completed transfers has reached a predefined threshold value, no further transfer is possible.

BRIEF DESCRIPTION OF THE DRAWING

In the following, an example of the invention is described in greater detail on the basis of the attached FIGURE, which shows a sequence diagram to illustrate the main features of the method according to the invention.

DETAILED DESCRIPTION OF THE PREFERRED EMBODIMENTS

Referring to the attached figure, at the start of the method an electronic access permission is purchased by a buyer 1 by means of an interaction with a server 2 (step 1), wherein when the electronic access permission is purchased by the buyer a password or authentication data is specified. Then (step 2), the electronic access permission is transferred from the server 1 to a mobile electronic device 3 specified during the purchase of the access permission, by means of a link for downloading the access permission, wherein a wallet application installed on the mobile device 3 activates the link and in order to download the acquired access permission, a unique ID of the mobile electronic device is transmitted to the server 2 (step 3), wherein it is verified in the server 2 whether an ID of the acquired access permission is associated with the transmitted unique ID of the mobile electronic device 3, wherein if this is not the case, the access permission ID and the unique ID of the mobile electronic device 3 are associated with each other (step 4) and the electronic access permission is then downloaded.

If the electronic access permission is to be transferred from one mobile electronic device 3 to another mobile electronic device 4, i.e., if the access permission ID has already been associated with a unique ID of a mobile electronic device 3, then after initiation of the process by the owner of the mobile electronic device 3 (step 5) with whose unique ID the access permission ID is associated, the wallet application of the mobile electronic device 3, with whose unique ID the access permission ID is associated, transmits a link for downloading the access permission to the other mobile electronic device 4 (step 6), wherein the wallet application of the other mobile electronic device 4 activates the link (step 7) and transmits a unique ID of the other mobile electronic device 4 to the server 2.

It is then verified in the server 2 whether an association of the access permission ID with a unique ID of another mobile electronic device exists, wherein if this is the case, the server 2 sends a link to the other mobile electronic device 4 (step 8), the activation of which by the wallet application leads to an input screen for entering either the password specified by the purchaser of the access permission or for the authentication data specified by the purchaser of the access permission (step 9), wherein if the password is valid or the authentication data is valid, the access permission ID is associated with the ID of the other mobile electronic device 4 in the server 2 and the electronic access permission is downloaded to the other mobile electronic device 4 (step 10).

The access permission stored on the first mobile electronic device 3 is then marked by the server 2 as invalid (step 11), preferably by means of a push message to the wallet application.

The invention claimed is:

1. A method for preventing misuse of an electronic access permission, which is manageable with a mobile electronic device using a mobile device application, the electronic access permission being transmitted to the mobile electronic device by an access permission server controlling an initial purchase of the electronic access permission as well as any subsequent transfer of the electronic access permission, the method comprising:

defining and transmitting to the access permission server, during the initial purchase of the electronic access permission, a first mobile electronic device ID and either a password or authentication data;

associating, in the access permission server, the ID of the electronic access permission with the unique ID of the first mobile electronic device;

transmitting from the access permission server the electronic access permission to the first mobile electronic device;

following transmission of the electronic access permission to the first mobile electronic device, initiating a transfer of the electronic access permission to another mobile electronic device;

transmitting an information related to the electronic access permission ID from the first mobile electronic device to the other mobile electronic device, and, with a mobile device application of the other mobile electronic device, transmitting a unique ID of the other mobile electronic device to the access permission server;

after transmitting the unique ID of the other mobile electronic device to the access permission server, verifying, in the access permission server, that the ID of the electronic access permission is associated with the unique ID of another mobile electronic device;

after verifying that the ID of the electronic access permission is associated with the unique ID of another mobile electronic device, transmitting the information related to the electronic access permission ID from the access permission server to the other mobile electronic device;

requesting by the access permission server the password or the authentication data defined during the initial purchase of the electronic access permission;

determining that the password or the authentication data specified by a buyer is valid;

after determining that the password or the authentication data specified by the buyer is valid, associating the ID of the electronic access permission with the unique ID of the other mobile electronic device and transmitting the electronic access permission from the access permission server to the other mobile electronic device;

invalidating the electronic access permission on the first mobile electronic device by means of a message from the access permission server to the mobile device application of the first mobile electronic device and deleting on the access permission server, the association between the electronic access permission and the first mobile electronic device;

wherein the transmitting the unique ID of the mobile electronic device to the access permission server (2), via the mobile device application of the mobile electronic device, is performed in order to receive the electronic access permission, the method further comprising:
- determining, in the access permission server (2), whether the ID of the electronic access permission is associated with the transmitted unique ID of the mobile electronic device;
- failing to verify, in the access permission server, that the ID of the electronic access permission is associated with the transmitted unique ID of the mobile electronic device, and subsequently associating, in the access permission server (2), the ID of the electronic access permission with the transmitted unique ID of the mobile electronic device and then receiving the electronic access permission by the mobile electronic device;
- after initiation of the transfer by the purchaser (1) on the mobile electronic device with whose unique ID the electronic access permission ID is associated, subsequently transferring the electronic access permission from the mobile electronic device to the other mobile electronic device, including transmitting an information related to the electronic access permission ID from the mobile electronic device to the other mobile electronic device, via the mobile device application of the mobile electronic device, for receiving the electronic access permission by the other mobile electronic device; and
- after determining that the password is valid or the authentication data are valid, then receiving the electronic access permission by the other mobile electronic device.

2. The method according to claim 1, further comprising:
- during the transfer process of the electronic access permission to another mobile electronic device, determining how often the electronic access permission has already been transferred; and
- preventing any further transfer of the electronic access permission after the number of the completed associations of the ID of the electronic access permission with unique IDs of mobile electronic devices has reached a predefined threshold value.

3. The method according to claim 1, further comprising:
- after transmitting the unique ID of the other mobile electronic device to the access permission server, verifying, in the access permission server, that the ID of the electronic access permission is associated with the unique ID of any mobile electronic device different than the other mobile electronic device;
- after verifying that the ID of the electronic access permission is associated with the unique ID of any mobile electronic device different than the other mobile electronic device, transmitting the information related to the electronic access permission ID from the access permission server to the other mobile electronic device.

4. A method for preventing unauthorized use of electronic access permissions that can be managed in mobile electronic devices by means of mobile device applications, the electronic access permissions being transmitted to the mobile electronic devices from an access permission server, the method comprising:
- defining and transmitting to the access permission server, during the initial purchase of the electronic access permission, a first mobile electronic device ID and either a password or authentication data;
- associating, in the access permission server, the ID of the electronic access permission with the unique ID of the first mobile electronic device;
- transferring the electronic access permission from the access permission server to the first mobile electronic device;
- enabling a transfer of the electronic access permission from the first mobile electronic device, the unique ID of which is associated with the ID of the electronic access permission, to another mobile electronic device;
- transmitting an information related to the electronic access permission ID from the first mobile electronic device to the other mobile electronic device by a mobile device application of the first mobile electronic device and transferring a unique ID of the other mobile electronic device from the other mobile electronic device to the access permission server;
- after transmitting the unique ID of the other mobile electronic device to the access permission server, verifying, in the access permission server, that the ID of the electronic access permission is associated with the unique ID of another mobile electronic device;
- after verifying that the ID of the electronic access permission is associated with the unique ID of another mobile electronic device, transmitting the information related to the electronic access permission ID from the access permission server to the other mobile electronic device;
- requesting by the access permission server the password or the authentication data defined during the initial purchase of the electronic access permission;
- after the password or the authentication data specified by a buyer during the initial purchase of the electronic access permission is entered and determined to be valid, associating the unique ID of the other mobile electronic device with the ID of the electronic access permission to be transferred, transferring the electronic access permission to the other mobile electronic device, and marking the electronic access permission associated with the first mobile electronic device in the electronic access permission server as invalid;
- in the electronic access permission server, deleting the association between the unique ID of the first mobile electronic device and the electronic access permission and storing data;
- wherein the transmitting the unique ID of the mobile electronic device to the access permission server (2), via the mobile device application of the mobile electronic device, is performed in order to receive the electronic access permission, the method further comprising:
- determining, in the access permission server (2), whether the ID of the electronic access permission is associated with the transmitted unique ID of the mobile electronic device;
- failing to verify, in the access permission server, that the ID of the electronic access permission is associated with the transmitted unique ID of the mobile electronic device, and subsequently associating, in the access permission server (2), the ID of the electronic access permission with the transmitted unique ID of the mobile electronic device and then receiving the electronic access permission by the mobile electronic device;
- after initiation of the transfer by the purchaser (1) on the mobile electronic device with whose unique ID the electronic access permission ID is associated, subsequently transferring the electronic access permission from the mobile electronic device to the other mobile electronic device, including transmitting an information related to the electronic access permission ID from the mobile electronic device to the other mobile electronic device, via the mobile device application of the mobile electronic device, for receiving the electronic access permission by the other mobile electronic device; and after determining that the password is valid or the authentication data are valid, then receiving the electronic access permission by the other mobile electronic device.

5. The method according to claim 4, further comprising:
during the transfer process of the electronic access permission from either the first mobile electronic device to the other mobile electronic device or from the other mobile electronic device to a further mobile electronic device, determining how often the electronic access permission has already been transferred; and after the number of the completed associations of the ID of the electronic access permission with unique IDs of mobile electronic devices has reached a predefined threshold value, preventing any further transfer of the electronic access permission.

6. The method according to claim 4, further comprising:
after transmitting the unique ID of the other mobile electronic device to the access permission server, verifying, in the access permission server, that the ID of the electronic access permission is associated with the unique ID of any mobile electronic device different than the other mobile electronic device;

after verifying that the ID of the electronic access permission is associated with the unique ID of any mobile electronic device different than the other mobile electronic device, transmitting the information related to the electronic access permission ID from the access permission server to the other mobile electronic device.

* * * * *